US012771805B1

(12) United States Patent
Rathi et al.

(10) Patent No.: US 12,771,805 B1
(45) Date of Patent: Oct. 20, 2026

(54) SYSTEMS AND METHODS FOR GENERATING GROUP EFFECTS IN REAL-TIME COMMUNICATION SESSIONS

(71) Applicant: Meta Platforms, Inc., Menlo Park, CA (US)

(72) Inventors: Chinmayee Rathi, Sunnyvale, CA (US); Amar Guntamadugu, Union City, CA (US); Yuyan Huang, Sunnyvale, CA (US); Pablo Gomez Basanta, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 356 days.

(21) Appl. No.: 18/064,518

(22) Filed: Dec. 12, 2022

(51) Int. Cl.
*H04N 5/272* (2006.01)

(52) U.S. Cl.
CPC .................................. *H04N 5/272* (2013.01)

(58) Field of Classification Search
CPC ...................................................... H04N 5/272
See application file for complete search history.

(56) References Cited

U.S. PATENT DOCUMENTS

2021/0141524 A1* 5/2021 Park .......................... G06F 8/34
2021/0240314 A1* 8/2021 Wohlstadter ........ G06F 3/04845
2022/0067946 A1* 3/2022 Zhou ......................... G06T 7/11
2022/0139041 A1* 5/2022 Li ....................... G06F 16/9558
345/419
2022/0157342 A1* 5/2022 Kliushkin ............ G11B 27/036
2022/0244836 A1* 8/2022 O'Leary ............. G06F 3/04845
2023/0007189 A1* 1/2023 Balaji .................... H04N 7/152
2023/0344662 A1* 10/2023 Banks ................. H04L 12/1822
2024/0046429 A1* 2/2024 Amirghodsi ............. G06T 7/11

* cited by examiner

*Primary Examiner* — Phung-Hoang J Nguyen
(74) *Attorney, Agent, or Firm* — EVERSHEDS SUTHERLAND (US) LLP

(57) ABSTRACT

The disclosed computer-implemented method may include systems for generating group effects within real-time communication sessions. For example, the disclosed systems and methods can generate participant masks indicating areas of interest within video streams of a real-time communication session. The disclosed systems and methods can then incorporate the video streams into shared group effects based on the participant masks. Various other methods, systems, and computer-readable media are also disclosed.

19 Claims, 8 Drawing Sheets

SYSTEMS AND METHODS FOR GENERATING GROUP EFFECTS IN REAL-TIME COMMUNICATION SESSIONS

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
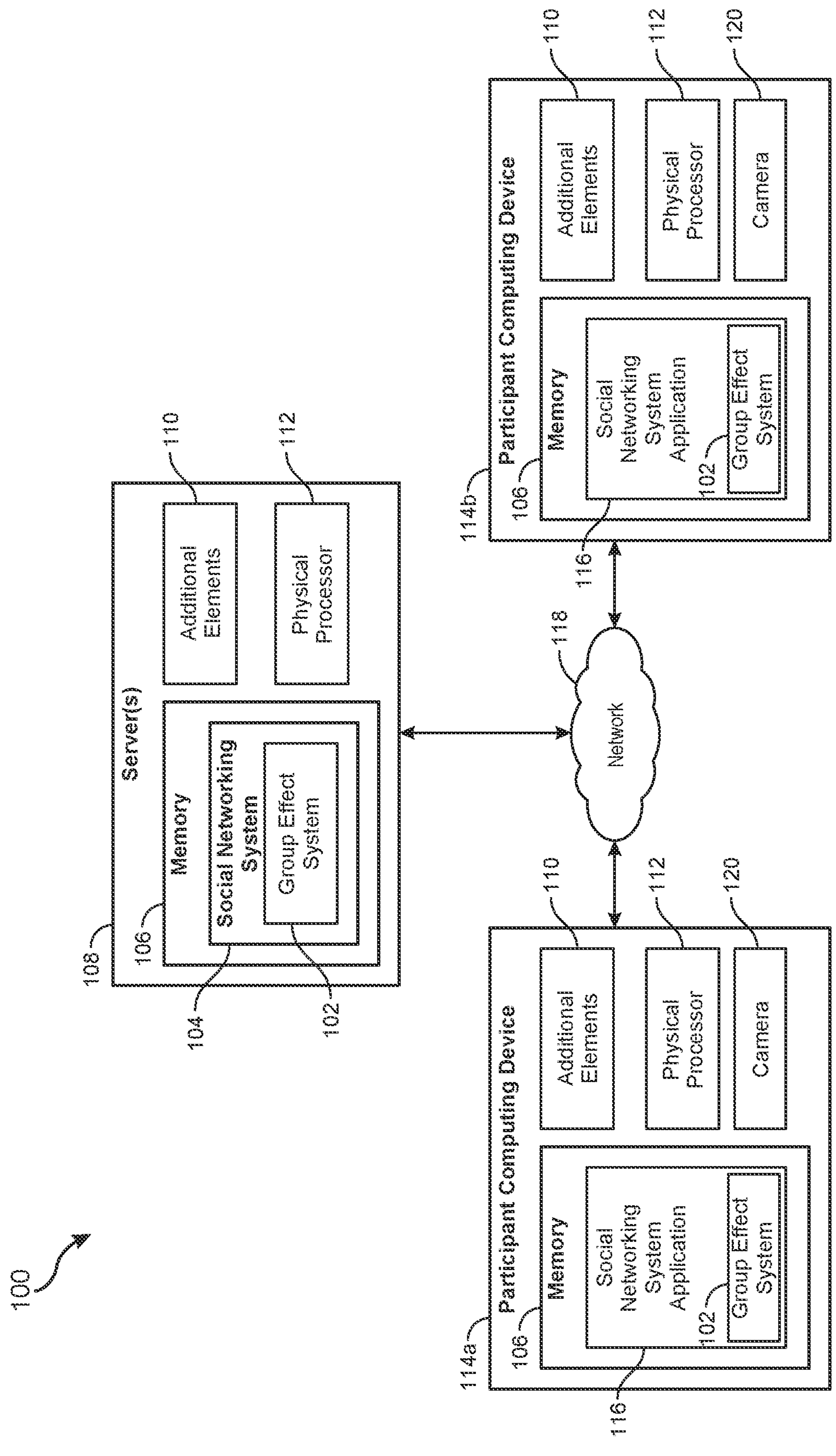
FIG. 1 is an overview diagram of an environment in which a group effect system operates in accordance with one or more implementations.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

Social networking systems provide many ways for users to engage with each other. For example, many social networking systems enable users to communicate with each other via real-time communication sessions such as video chats. During a video chat, two or more participants can both see and hear each other. Despite this, example social networking systems often fail to provide ways for users to enhance their real-time communication sessions beyond merely hearing and seeing each other.

As such, the present disclosure describes implementations that can generate one or more group effects within a real-time communication session. For example, one or more implementations described herein can incorporate video streams of a real-time communication session into a shared group effect during a real-time communication session, thereby enriching the session participants' real-time communication experience. To illustrate, the implementations described herein can determine participant masks associated with each of the video streams depicting session participants during the real-time communication session. The implementations described herein can further incorporate the video streams of those participants into the group effect based on the participant masks. In this way, for example, the implementations described herein can generate a group effect display including faces of the session participants rendered into animated scenes such as, but not limited to, roller coaster cars traveling on a roller coaster, astronauts floating in outer space, and more. Moreover, the implementations described herein can composite group effect content into participant video streams based on the participant masks so that, for example, participants can appear to be wearing the same hat, holding the same item, wearing complimenting apparel, blowing a candle out, and so forth.

In this way, the implementations described herein can provide real-time communication session participants with enhanced real-time communication features. By utilizing these enhanced group effects, users can engage with each other at a more immersive level than was previously available. Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
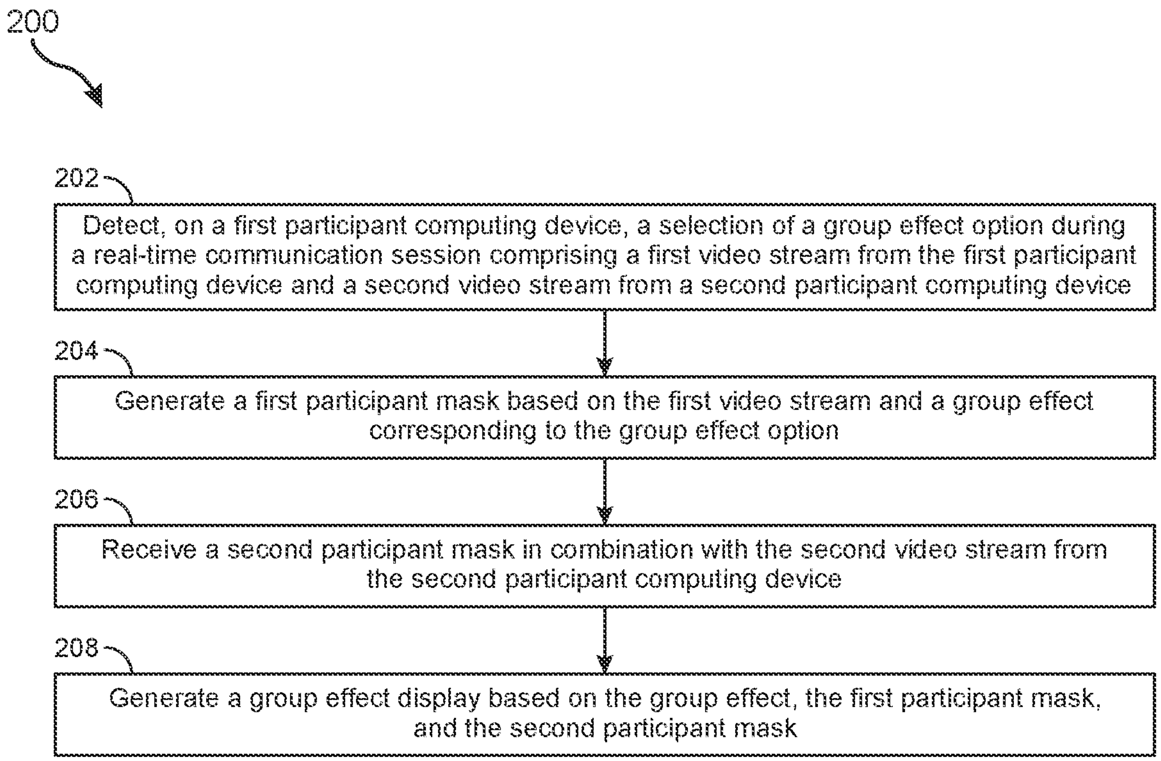
FIG. 2 is a flow diagram of an exemplary computer-implemented method for generating a group effect in a real-time communication session in accordance with one or more implementations.
Figure 3A:
FIGS. 3A-3F illustrate an example composition group effect generated by the group effect system in accordance with one or more implementations.
Figure 3B:
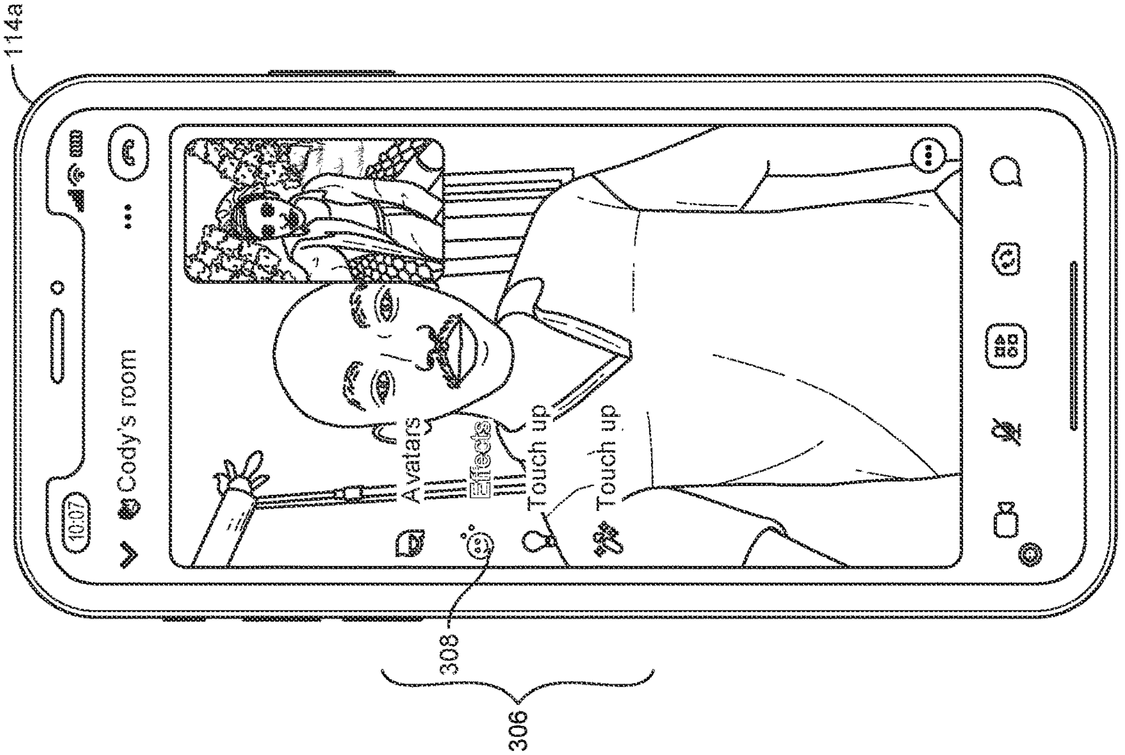
Figure 3D:
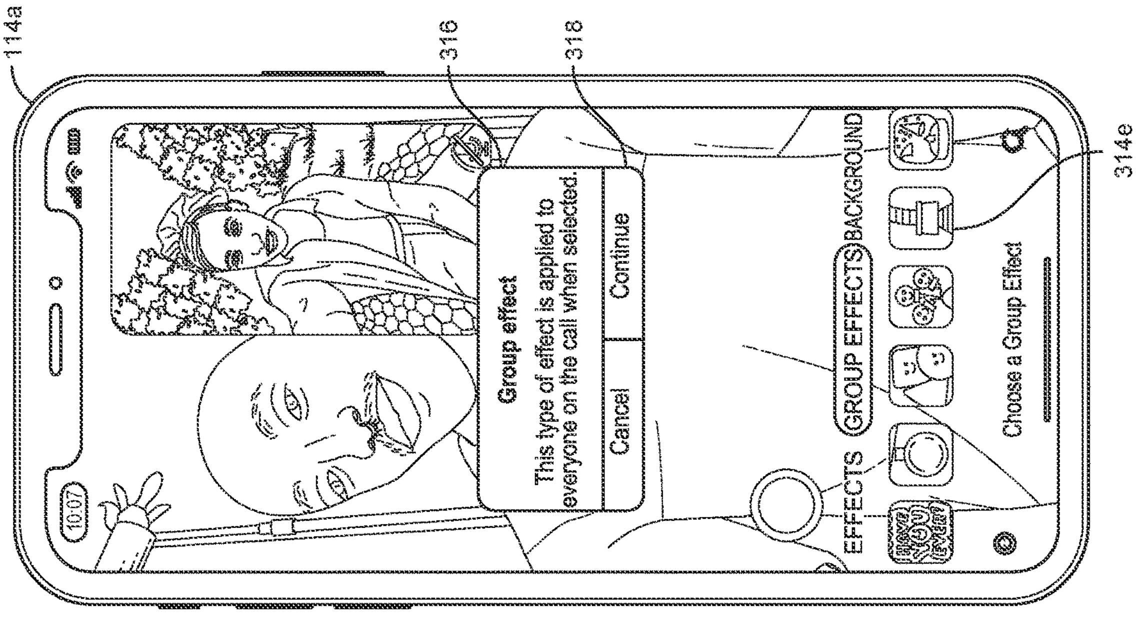
Figure 3C:
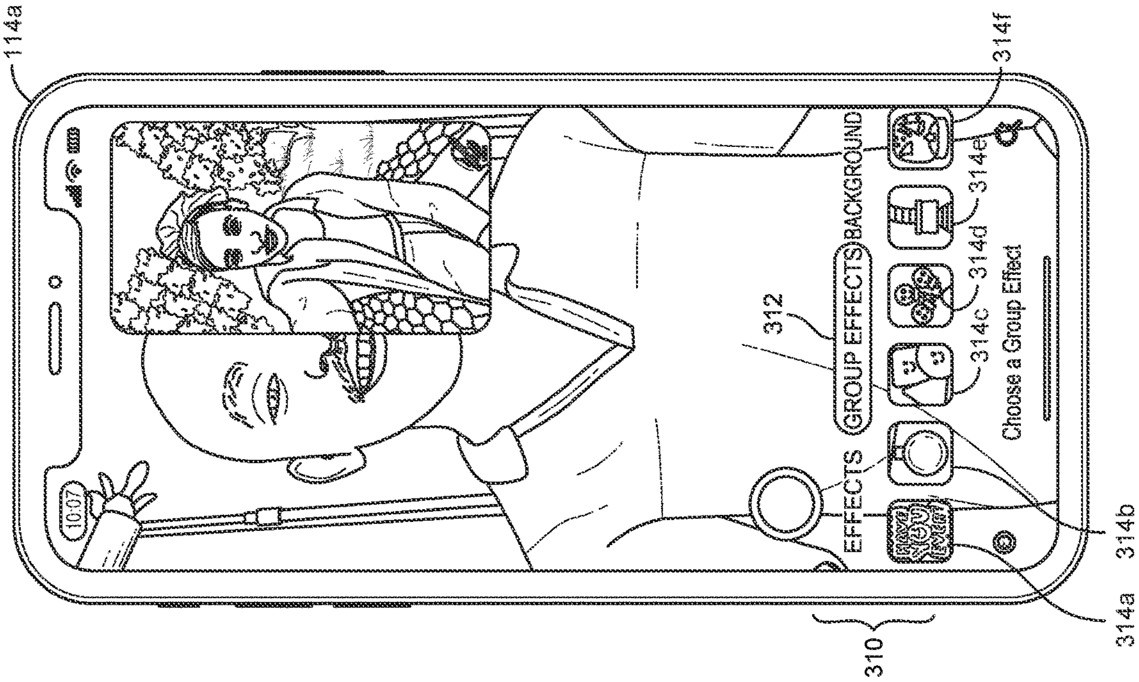
Figure 3F:
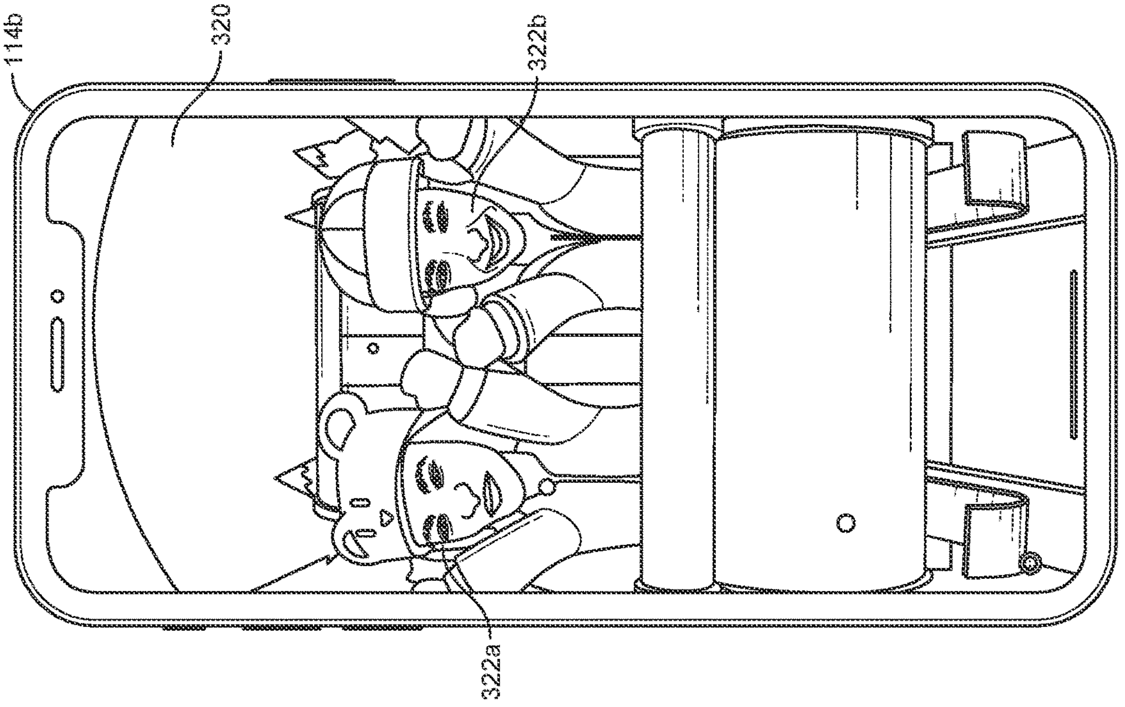
Figure 3E:
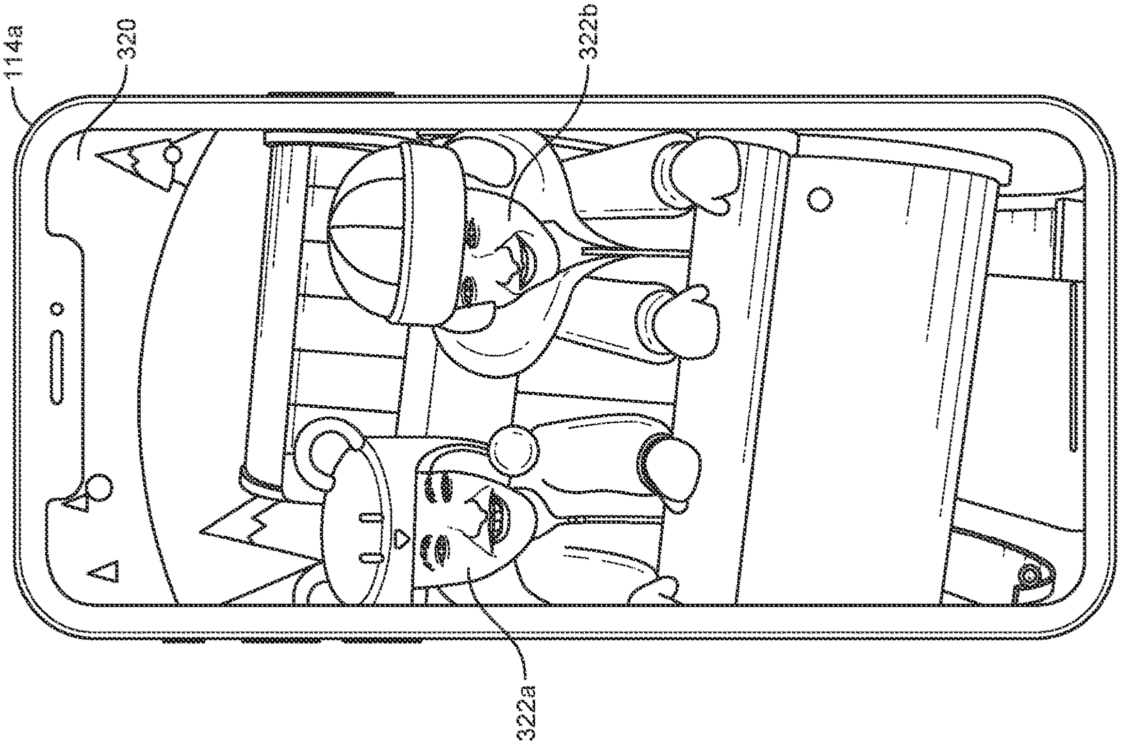
Figure 4A:
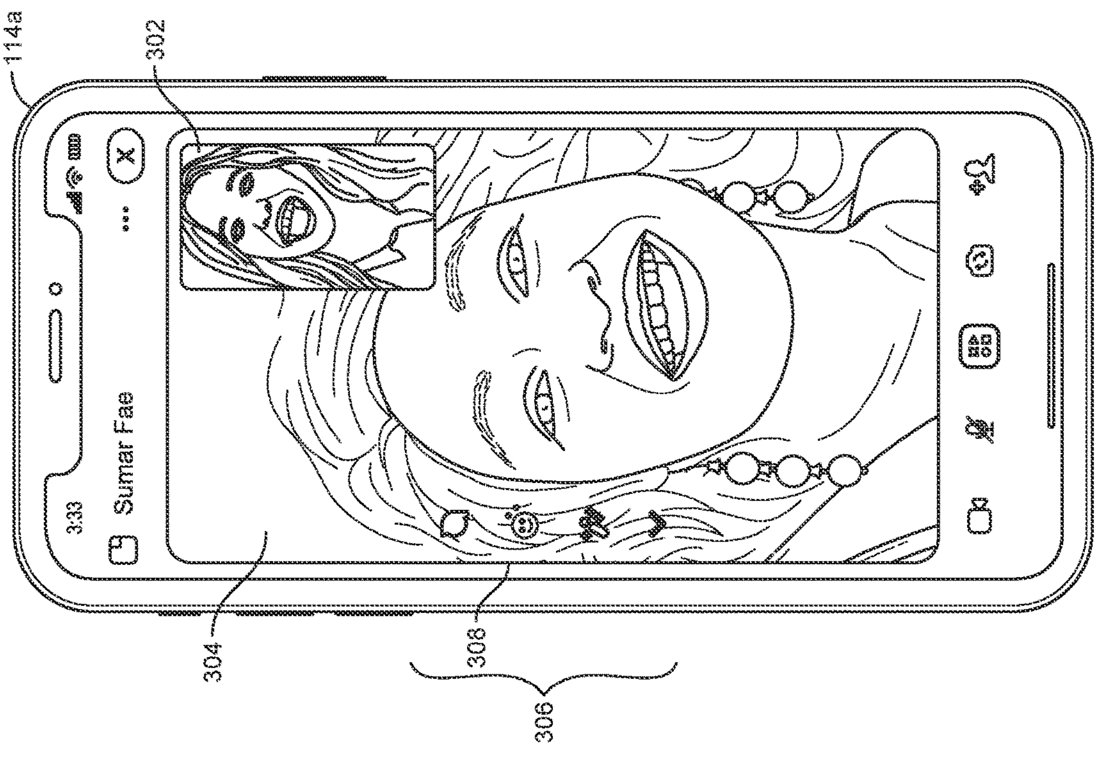
FIGS. 4A-4D illustrate an example multipeer group effect generated by the group effect system in accordance with one or more implementations.
Figure 4B:
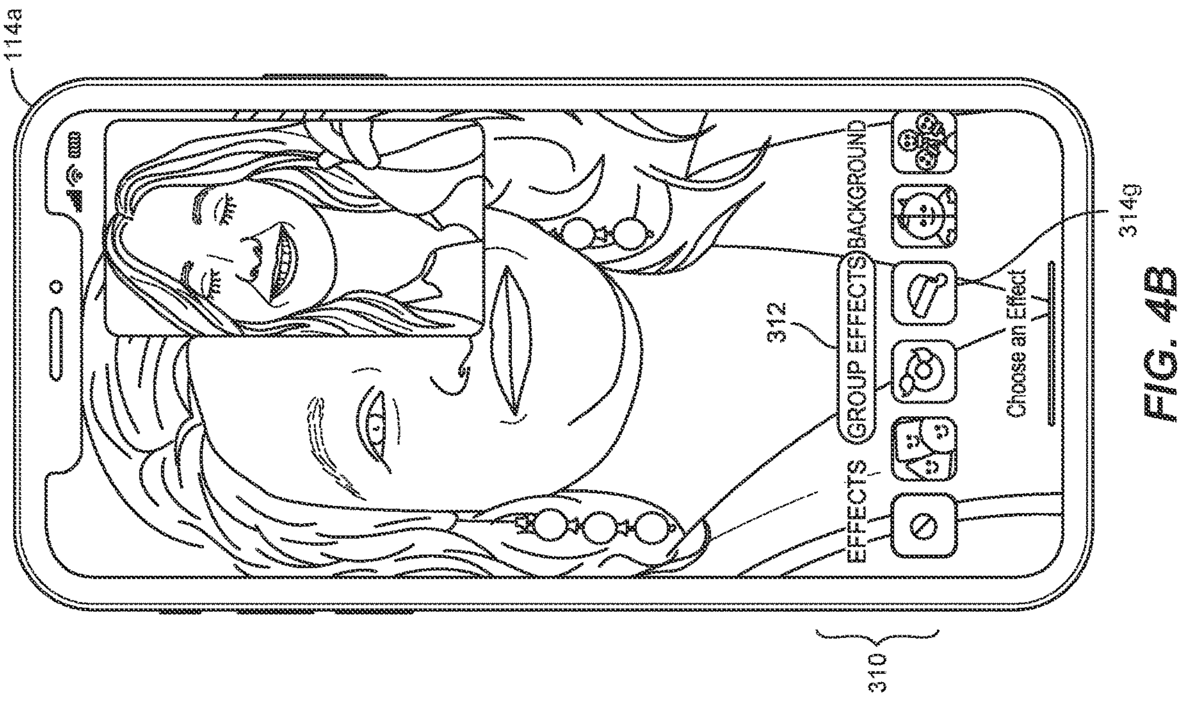
Figure 4D:
Figure 4C:
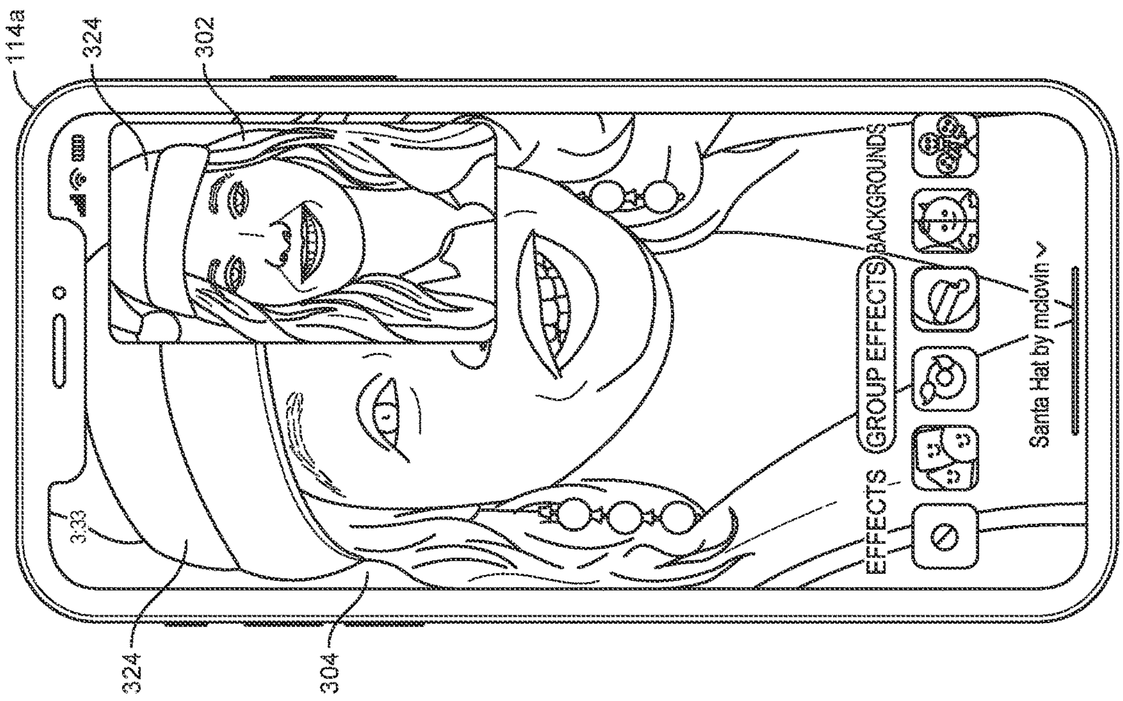
Figure 5:
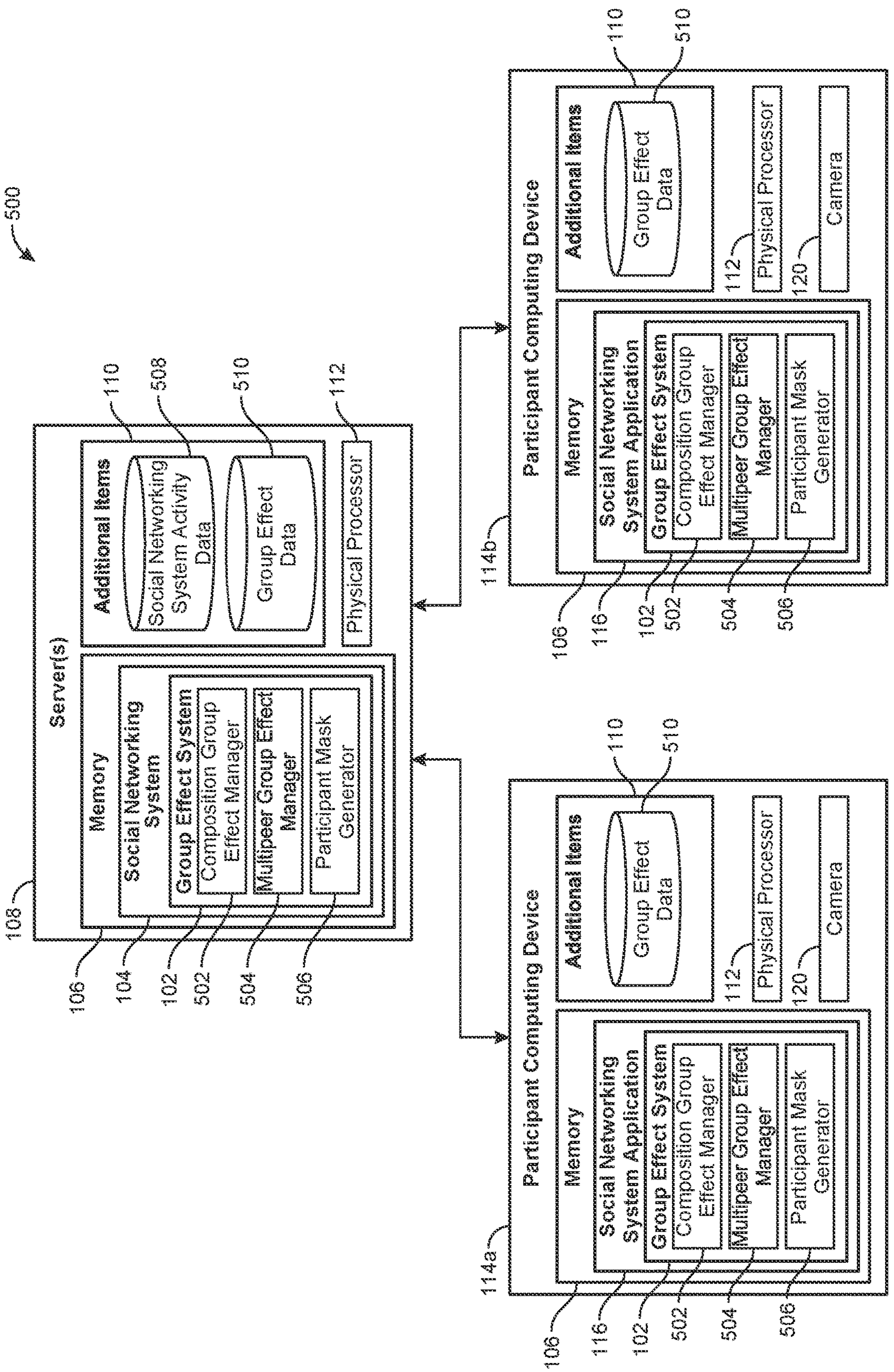
FIG. 5 is a detailed diagram of the group effect systemin accordance with one or more implementations.

The following will provide with reference to FIGS. 1-5, detailed descriptions of a group effect system that incorporate video streams of participant computing devices into various shared group effects during real-time communication sessions. For example, FIG. 1 illustrates a networked environment where the group effect system can operate from a central server and/or one or more participant computing devices. FIG. 2 further illustrates a flow diagram of steps taken by the group effect system in generating one or more group effects during a real-time communication session between two or more session participants. FIGS. 3A-3F illustrate the group effect system generating a composition group effect during a real-time communication session. FIGS. 4A-4D illustrate the group effect system generating a multipeer group effect during a real-time communication session. FIG. 5 further illustrates an overview of the features and functionality of the group effect system.

As just mentioned, FIG. 1 illustrates an exemplary networking environment 100 implementing aspects of the present disclosure. For example, the networking environment 100 can include server(s) 108, participant computing devices 114*a*, 114*b*, and a network 118. As further shown, the server(s) 108, the participant computing devices 114*a*, 114*b* can each include a memory 106, additional elements 110, and a physical processor 112. Additionally, each of the participant computing devices 114*a*, 114*b* can include a camera 120.

In one or more implementations, the group effect system 102 is implemented on the participant computing devices 114*a*, 114*b* as part of a social networking system application 116 installed thereon within the memories 106. For example, the group effect system 102 can perform the same or different functions when installed on the participant computing devices 114*a*, 114*b*. To illustrate, the group effect system 102 can perform the same functions on both the participant computing device 114*a* and the participant computing device 114*b*, such as generating participant masks and group effect displays. In additional implementations, the group effect system 102 can perform different functions when operating from the server(s) 108.

In at least one implementation, a group effect system 102 is implemented as part of a social networking system 104, within the memory 106 of the server(s) 108. In some implementations, the group effect system 102 installed on the server(s) 108 can identify and provide relevant social networking system data and/or real-time communication session video streams to either or both of the participant computing devices 114*a*, 114*b*. As shown in FIG. 1, the participant computing devices 114*a*, 114*b*, and the server(s) 108 can communicate via the network 118 to send and receive real-time communication data.

As illustrated in FIG. 1, the participant computing device 114*a* and the participant computing device 114*b* can include any type of user device suitable for real-time communication including, but not limited to, smart phones, smart wearables, laptop computers, desktop computers, tablet computers, video conferencing devices, and virtual reality devices. In one or more implementations, the participant computing devices 114*a*, 114*b* can also include the camera 120. The camera 120 can capture digital photographs and/or digital videos. The camera 120 can also provide a live stream of digital video frames to the social networking system application 116 for transmission during a real-time communication session. In at least one implementation, social networking system application 116 can also provide the live video stream captured by the camera 120 directly to one or more additional participant computing devices within the same real-time communication session.

As mentioned above, the group effect system 102 can operate as part of the social networking system 104. In one or more implementations, the social networking system 104 can support real-time video communication sessions between co-users of the social networking system 104 (e.g., social networking system friends). Furthermore, as shown in FIG. 1, the group effect system 102 can also operate as part of the social networking system application 116 installed on the participant computing devices 114*a*, 114*b*.

In one or more implementations, and as discussed in greater detail below, the group effect system 102 can provide notifications among participant computing devices within the same real-time communication session regarding selected group effects. The group effect system 102 can also generate participant masks associated with a selected group effect and send the participants masks in connection with the live video streams among the participant computing devices. Moreover, the group effect system 102 can generate a group effect display on each participant computing device. In one or more implementations, the group effect system 102 can generate the group effect display including a composition group effect by positioning the video streams into a shared scene display based on the participant masks. In additional implementations, the group effect system 102 can generate the group effect display including a multipeer group effect by compositing group effect content into the video streams based on the participant masks. These features are discussed in greater detail below with regard to FIGS. 3A-4D.

Furthermore, as shown in FIG. 1, the participant computing devices 114*a*, 114*b* can include the social networking system application 116. In one or more implementations, the social networking system application 116 transmits and receives data to and from the group effect system 102 and/or the social networking system 104. In at least one implementation, the social networking system application 116 can transmit and receive real-time communication streams during a real-time communication session (e.g., a video chat).

As mentioned above, the participant computing devices 114*a*, 114*b* and the server(s) 108 may be communicatively coupled through the network 118. The network 118 may represent any type or form of communication network, such as the Internet, and may include one or more physical connections, such as a LAN, and/or wireless connections, such as a WAN.

Although FIG. 1 illustrates components of the networking environment 100 in one arrangement, other arrangements are possible. For example, in one implementation, the group effect system 102 and the social networking system 104 may exist across multiple networked servers or other computing devices. In another implementation, the group effect system 102 may operate as a web browser plugin and/or an extension to the social networking system application 116. In additional implementations, the networking environment 100 may include any number of computing devices and/or servers. For example, the networking environment 100 can include any number of participant computing devices. In at least one implementation, the group effect system 102 exists only on the participant computing devices 114*a*, 114*b* without any intermediary server.

In one or more implementations, the methods and steps performed by the group effect system 102 reference multiple terms. As used herein, a "real-time communication session" can refer to two or more media streams that are simultaneously transmitted to two or more session participant computing devices. For example, the social networking system 104 can receive media streams from session participant computing devices, and transmit the received media streams among the session participant computing devices. In some implementations, the social networking system 104 can format or edit a received media stream before transmitting that media stream to another session participant computing device.

As used herein, the term "frames" can refer to individual image captures within a digital video stream (e.g., a media stream). For example, and depending on the frame capture rate, a digital video stream can include multiple frames per second. Each frame may include a digital image and may correspond to a particular audio time stamp in an associated audio stream.

As used herein, the term "group effect" can refer to a digital effect that is simultaneously applied to all of the digital video streams in a real-time communication session. Group effects can include both visual content and/or audio content. For example, a group effect can include animated content, foreground display content, and/or sound effects. In one or more implementations, a group effect can also include masking instructions. For example, a group effect's masking instructions can include a definition of one or more objects to generate a participant mask around in a digital video stream such as, for example, a participant's face. The group effect's masking instructions can further include instructions as to how to position or utilize a masked area of a digital video stream in connection with the group effect. To illustrate, the masking instructions can indicate that a masked area of a digital video stream should be inserted into a particular location within a group effect (e.g., as with a composition group effect). Additionally, the masking instructions can indicate that foreground display content of the group effect should be positioned over a masked area of a digital video stream (e.g., as with a multipeer group effect). As used herein, the term "mask" can refer to boundaries of an area within a video stream (or frames of a video stream) that outline an object of interest. For example, a mask around a participant's face can include a set of pixel coordinates that define boundaries around the participant's face in the video stream.

As mentioned above, FIG. 2 is a flow diagram of an exemplary computer-implemented method 200 for incorporating group effects into a real-time communication session. The steps shown in FIG. 2 may be performed by any suitable computer-executable code and/or computing system, including the system(s) illustrated in FIG. 5. In one example, each of the steps shown in FIG. 2 may represent an algorithm whose structure includes and/or is represented by multiple sub-steps, examples of which will be provided in greater detail below.

As illustrated in FIG. 2, at step 202 the group effect system 102 can detect, on a first participant computing device, a selection of a group effect option during a real-time communication session comprising a first video stream from the first participant computing device and a second video stream from a second participant computing device. For example, the group effect system 102 can provide various group effect options for selection by one or more real-time communication session participants during a real-time communication session. In one or more implementations, the group effect system 102 can provide group effect options associated with composition group effects and/or multipeer group effects.

As further shown in FIG. 2, at step 204 the group effect system 102 can generate a first participant mask based on the first video stream and a group effect corresponding to the group effect option. For example, the group effect system 102 can generate the first participant mask by accessing masking instructions associated with the selected group effect. To illustrate, the masking instructions may indicate that the participant mask should define the boundaries of the first participant's face, the first participant's head, the first participant's hand, etc. Based on these instructions, the group effect system 102 can generate the mask including display coordinates that outline the area indicated by the masking instructions within the frames of the first video stream.

At step 206, as shown in FIG. 2, the group effect system 102 can receive a second participant mask in combination with the second video stream from the second participant computing device. For example, upon providing notification to the second participant computing device of the selected group effect option, the group effect system 102 on the second participant computing device can generate the second participant mask as described above. The group effect system 102 can further provide the second participant mask along with the second video stream to the first computing device.

As further shown in FIG. 2, at step 208 the group effect system 102 can generate a group effect display based on the group effect, the first participant mask, and the second participant mask. For example, the group effect system 102 can generate the group effect display on the first participant computing device by cropping video frames of both the first video stream and the second video stream according to their respective participant masks. The group effect system 102 can then position the cropped video streams within foreground display content of the group effect. In at least one implementation, the completely group effect can give the appearance of the first participant and the second participant together within a digital scene including, for example, an animation or digital game.

As discussed above, the group effect system 102 can enhance real-time communication sessions by generating group effect displays incorporating participant video streams. FIGS. 3A-4D illustrate group effects generated by the group effect system 102 during a real-time communication session. For example, as shown in FIG. 3A, the social networking system 104 can initiate a real-time communication session between the participant computing device 114*a* and the participant computing device 114*b*. Upon initialization of the real-time communication session, the social networking system 104 can provide an interface on the participant computing device 114*a* including a first video stream display 302 and a second video stream display 304. In one or more implementations, the first video stream display 302 can show the video stream being captured and transmitted by the camera 120 of the participant computing device 114*a*. Additionally, the second video stream display 304 can show the video stream being captured and transmitted by the camera 120 of the participant computing device 114*b*.

In one or more implementations, the group effect system 102 can provide options associated with group effects during the real-time communication session. For example, as shown in FIG. 3B, the group effect system 102 can provide an effects menu option 308 as part of a menu option list 306. In response to a detected selection of the effects menu option 308, the group effect system 102 can generate and provide a horizontally sliding tray 310 of different effect menu options including a group effect menu option 312, as shown in FIG. 3C. In response to a detected selection of the group effect menu option 312, the group effect system 102 can further generate and provide the group effect options 314*a*, 314*b*, 314*c*, 314*d*, 314*e*, and 314*f*. In one or more implementations, the group effect options 314*a*-314*f* can each be associated with a particular group effect-either a composition group effect or a multipeer group effect.

In response to a detected selection of certain group effect options, the group effect system 102 can generate notifications associated with the selected group effect option. For example, in response to a detected selection of the group effect option 314*e*, as shown in FIG. 3D, the group effect system 102 can generate and provide a notification 316 with information about the selected group effect option 314*e*. As shown, the group effect system 102 can generate the notification 316 informing the user of the participant computing device 114*a* that the group effect corresponding to the group effect option 314*e* is applied to all of the real-time communication session participants once selected. In response to a detected selection of a continue button 318 within the notification 316, the group effect system 102 can begin the process of generating a group effect display associated with the group effect option 314*e*.

As will be discussed in greater detail below with regard to FIG. 5, the group effect system 102 generates a group effect display by generating participant masks from the video streams within the real-time communication session, and incorporating the video streams into the selected group effect based on the participant masks. For example, as shown in FIG. 3E, the group effect system 102 can generate a group effect display 320 on the participant computing device 114*a* based on masked portions of the first video stream (e.g., shown in the first video stream display 302) and the second video stream (e.g., shown in the second video stream display 304).

As further shown in FIG. 3E, the group effect corresponding to the selected group effect option 314*e* is a composition group effect. As such, the group effect system 102 generates the group effect display 320 by generating participant masks from the first video stream and the second video stream and then positioning areas of the first and second video streams defined by the participant masks within foreground display content of the selected group effect. To illustrate, the selected group effect shown in FIG. 3E is an animation of riders in a sled that is moving along a track. As such, selected group effect includes foreground display content such as the sled and the rider bodies. In one or more implementations, the group effect system 102 populates the foreground display content by generating participant masks that define areas around the participant's faces in the first and second video streams. The group effect system 102 can then position the areas of the first and second video streams defined by those participant masks (e.g., areas 322*a*, 322*b*) within the foreground display content of the selected group effect to generate the group effect display 320.

In one or more implementations, the group effect system 102 continually updates the participant masks and the positioning of the corresponding areas within the selected group effect throughout the duration of the selected group effect. For example, as mentioned above, the group effect associated with the group effect display 320 can include an animation of riders in a sled. As such, the animation can include the rider bodies moving (e.g., raising their hands as shown in FIG. 3F), as well as the sled shifting side to side as it moves along the track. While this animation is playing, the group effect system 102 can continue to generate participant masks associated with the first and second video streams and update the positioning of the correlated area of the first and second video streams within the group effect. In this way, for example, the group effect system 102 can continually reflect changes in participant expressions and or facial orientations within the group effect display 320.

As mentioned above, the group effect system 102 can generate multipeer group effects in addition to composition group effects, such as the composition group effect illustrated above in FIGS. 3A-3F. As such, FIGS. 4A-4D illustrate the group effect system 102 generating and providing a multipeer group effect during a real-time communication session.

For example, as shown in FIG. 4A, the social networking system 104 can provide an interface including the first video stream display 302 and the second video stream display 304 on the participant computing device 114*a*. As described above with reference to FIG. 3B, the group effect system 102 can detect a selection of the effects menu option 308 from within the menu option list 306. In response to this detected selection, as shown in FIG. 4B, the group effect system 102 can generate and provide the horizontally sliding tray 310 including the group effect menu option 312. As mentioned above, the group effect system 102 can generate group effect options 314 associated with both composition group effects and multipeer group effects in response to a detected selection of the group effect menu option 312.

In response to a detected selection of a group effect option 314*g*, the group effect system 102 can generate a multipeer group effect display as shown in FIG. 4C. For example, and as will be discussed in greater detail below with regard to FIG. 5, the group effect system 102 can generate a multipeer group effect display that composites group effect content 324 (e.g., a hat) into the first video stream display 302 and the second video stream display 304 based on participant masks associated with the users shown in the first video stream display 302 and the second video stream display 304. As further shown in FIG. 4D, the group effect system 102 can continually update the positioning of the group effect content 324 in both the first video stream display 302 and the second video stream display 304 as the participants shown therein change their positioning, facial expressions, head orientation, etc.

As mentioned above, the group effect system 102 performs various functions in connection with generating group effects during real-time communication sessions. FIG. 5 is a block diagram 500 of the group effect system 102 operating within the social networking system 104 on the server(s) 108, and within the social networking system application 116 on the participant computing devices 114*a*, 114*b*, while performing these functions. As such, FIG. 5 provides additional detail with regard to these functions. For example, as shown in FIG. 5, the group effect system 102 can include a composition group effect manager 502, a multipeer group effect manager 504, and a participant mask generator 506. Moreover, the additional elements 110 on the server(s) can include social networking system activity data 508 and group effect data 510, while the additional elements 110 on the participant computing devices 114*a*, 114*b* can include group effect data 510.

In certain implementations, the group effect system 102 may represent one or more software applications or programs that, when executed by a computing device, may cause the computing device to perform one or more tasks. For example, and as will be described in greater detail below, one or more of the composition group effect manager 502, the multipeer group effect manager 504, and the participant mask generator 506 of the group effect system 102 may represent software stored and configured to run on one or more computing devices, such as the server(s) 108. One or more of the composition group effect manager 502, multipeer group effect manager 504, and the participant mask generator 506 of the group effect system 102 shown in FIG. 5 may also represent all or portions of one or more special purpose computers to perform one or more tasks.

As mentioned above, and as shown in FIG. 5, the group effect system 102 can include the composition group effect manager 502. In one or more implementations, the composition group effect manager 502 generates composition group effects during real-time communication sessions. For example, the composition group effect manager 502 can provide group effect options and identify a composition group effect associated with a selected group effect option.

To illustrate, the composition group effect manager 502 can provide group effect options (e.g., as shown in FIGS. 3C and 4C) based on social networking system activity data 508 associated with one or more of the real-time communication session participants. For example, the composition group effect manager 502 can provide group effect options that one or more of the participants have previously used, that have characteristics corresponding to social networking system activities of one or more of the participants, and/or that are associated with keywords and other metadata that corresponds with demographics of one or more of the participants. In additional implementations, the composition group effect manager 502 can provide a standard listing of group effect options. The composition group effect manager 502 can identify a group effect associated with a selected group effect option by identifying and providing the foreground display content and the masking instructions associated with the selected group effect option within the group effect data 510.

The composition group effect manager 502 can also generate notifications. For example, as discussed above with reference to FIGS. 3A-4D, the group effect system 102 can detect a selection of a group effect option during a real-time communication session. The composition group effect manager 502 can further identify the corresponding group effect including foreground display content and masking instructions. In order for the group effect to display correctly on all participant computing devices, the composition group effect manager 502 further generates a notification for the other participant computing devices that informs the other participant computing devices of the selected group effect. In one or more implementations, the composition group effect manager 502 generates and transmits the notification such that the notification causes the other participant computing devices to generate and transmit a participant mask to every other participant computing device.

Moreover, the composition group effect manager 502 can generate a group effect display based on a composition group effect. For example, the composition group effect manager 502 can receive participant masks along with the video streams from the other participant computing devices in the real-time communication session. In one or more implementations, the composition group effect manager 502 generates the group effect display for a composition group effect by cropping or otherwise editing each video stream according to the corresponding participant mask. To illustrate, the participant mask can include boundaries (e.g., pixel coordinates) of an area within a video stream that is indicated by the masking instructions. For example, the boundaries can be around a participant face within the video stream.

With the areas indicated by the masking instructions identified (e.g., by cropping or otherwise editing the participant video streams), the composition group effect manager 502 can generate the group effect display by incorporating those areas into the foreground display content of the composition group effect. For example, the composition group effect manager 502 can insert the cropped or edited video streams into predetermined locations within the foreground display content. To illustrate, an outer space composition group effect may include foreground display content that illustrates astronaut bodies floating in space with predetermined insertion locations that correspond with the astronaut's heads. As such, the composition group effect manager 502 can insert cropped video streams of session participant faces into those predetermined insertion locations to generate the group effect display.

In one or more implementations, the composition group effect manager 502 can also continually update the group effect display. For example, the composition group effect manager 502 can show the session participant's faces in real time within the group effect display by continuing to crop or otherwise edit the session participant video streams based on the masking instructions while positioning the cropped or edited video streams within the foreground display content. In this way, the composition group effect manager 502 maintains the intended area of the video streams at the insertion locations of the foreground display content even if the session participants change their positioning within their respective video streams.

As further shown in FIG. 5, the group effect system 102 can include the multipeer group effect manager 504. In one or more implementations, the multipeer group effect manager 504 can provide group effect options associated with multipeer group effects. As described above with regard to composition group effects, the multipeer group effect manager 504 can provide multipeer group effect options based on participant-specific factors (e.g., social networking system activity, demographic characteristics), or can provide a standard listing of multipeer group effect options. The multipeer group effect manager 504 can further identify a multipeer group effect associated with a selected group effect option by identifying masking instructions and foreground display content for the selected multipeer group effect within the group effect data 510.

In one or more implementations, the multipeer group effect manager 504 can also handle communication between participant devices in connection with a multipeer group effect. For example, some multipeer group effects include interactive foreground content that can move or change based on detected events within the video streams of the real-time communication session participants. To illustrate, a multipeer group effect may have foreground display content including a lit candle that is positioned in a participant's hand in a first video stream. In response to detecting a participant in a second video stream blowing air out of their mouth, the multipeer group effect can further include an animation that extinguishes the lit candle in the first video stream.

As such, the multipeer group effect manager 504 can include state management features to detect video stream events and update all instances of a multipeer group effect within a real-time communication session based on the detected events. For example, the multipeer group effect manager 504 can determine that a detected event on a first participant computing device (e.g., a participant blowing air out of their mouth) causes an effect within other instances of a multipeer group effect. As such, the multipeer group effect manager 504 can communicate a state change based on the detected event to other instances of the multipeer group effect on other participant computing devices within the real-time communication session.

To detect state changes based on such triggering events, the multipeer group effect manager 504 may utilize participant masks. For example, a multipeer group effect may have masking instructions indicating that areas of interest in a video stream include participant's faces, heads, hands, arms, and so forth. In at least one implementation, the multipeer group effect manager 504 may monitor the area of the video stream within the boundaries of the corresponding participant mask for triggering events. In one or more implementations, the multipeer group effect manager 504 can utilize computer vision techniques such as machine learning models to detect state changing events within a masked area of a participant video stream.

In one or more implementations, the multipeer group effect manager 504 can generate a group effect display based on a multipeer group effect. For example, the multipeer group effect manager 504 can generate a group effect display by adding and updating foreground display content based on states of the participant computing devices within the real-time communication session. To illustrate, the multipeer group effect manager 504 can generate a group effect display that maintains a position of foreground display content (e.g., an image of a paper airplane) within a masked area of a first video stream (e.g., a first participant's hand) until detecting a state change triggered by the first participant making a throwing motion. At that point, the multipeer group effect manager 504 can update the group effect display based on this state change by removing the foreground display content from the masked area of the first video stream. The multipeer group effect manager 504 can then render an animation of the foreground display content moving into a second video stream and landing in a masked area (e.g., a second participant's hand) within the second video stream. The multipeer group effect manager 504 can generate the group effect display that maintains the foreground display content within the second video stream until another state change is detected. In this way, the multipeer group effect manager 504 can generate group effect displays that make it appear as though session participants are collectively interacting with the same foreground display content.

In one or more implementations, both the composition group effect manager 502 and the multipeer group effect manager 504 can update group effects based on additional participants entering the real-time communication session or on participants leaving the real-time communication session. For example, both the composition group effect manager 502 and the multipeer group effect manager 504 can detect the addition of one or more participants to a real-time communication session. In response, the composition group effect manager 502 and the multipeer group effect manager 504 can notify the new participant computing device about the currently active group effect. The composition group effect manager 502 and the multipeer group effect manager 504 can then update the group effect displays across all participant devices to include the new video stream and participant mask. Similarly, upon detecting a participant computing device leave a real-time communication session, the composition group effect manager 502 and the multipeer group effect manager 504 can update the group effect displays on the remaining participant computing devices to remove the corresponding video stream.

Additionally, one or more of the composition group effect manager 502 and the multipeer group effect manager 504 can enable partial participation. In one or more implementations, the composition group effect manager 502 and/or the multipeer group effect manager 504 can enable one or more real-time communication session participants to opt out of a composition group effect. To illustrate, in a real-time communication session between five participants, the composition group effect manager 502 can provide an option for one or more of the five participants to be excluded from a composition group effect. The composition group effect manager 502 can generate the group effect display including the participants who have not opted out. The composition group effect manager 502 can further provide video stream displays of the opted-out participants adjacent to the group effect display. The composition group effect manager 502 can provide the group effect display on the participant computing devices of the opted-out participants such that everyone in the real-time communication session can see the group effect display as well as the regular video streams of the opted-out participants.

It follows that, in one or more implementations, the composition group effect manager 502 and the multipeer group effect manager 504 can enable multiple instances of group effects to run on participant computing devices. For example, in a real-time communication session between three participants, the composition group effect manager 502 can enable two of the participants to opt into in a first composition group effect while enabling the third participant to opt into a second composition group effect. In that scenario, the composition group effect manager 502 on the third participant's computing device can generate a notification associated with the second composition group effect and a participant mask based on the second composition group effect. The composition group effect manager 502 on all participant computing device can then generate a group effect sub-display according to the second composition group effect and the participant mask generated on the third participant's computing device. In this way, the composition group effect manager 502 can enable all real-time communication session participants to view the first and second participants within the first composition group effect and the third participant within the second composition group effect-all within the same group effect display.

As mentioned above, and as shown in FIG. 5, the group effect system 102 can include the participant mask generator 506. In one or more implementations, the participant mask generator 506 handles tasks associated with participant masks used by the composition group effect manager 502 and the multipeer group effect manager 504. For example, the participant mask generator 506 can generate a participant mask based on masking instruction associated with a selected group effect (e.g., a composition group effect or a multipeer group effect).

To illustrate, the participant mask generator 506 can determine an area of interested based on masking instructions associated with a group effect. For example, the masking instructions may indicate a video stream feature such as, but not limited to, a participant's face, hands, head, etc. The masking instructions may also indicate a maximum allowed area associated with the desired video stream feature. Based on these instructions, the participant mask generator 506 can utilize computer vision techniques (e.g., computer models, neural networks) to identify the desired video stream feature in a frame from the video stream. The participant mask generator 506 can further adjust the size of the area including the desired feature to be within the maximum allowed area indicated by the masking instructions. The participant mask generator 506 can also determine the boundaries of this area (e.g., as pixel coordinates) to transmit along with the video stream to other participant computing devices within the real-time communication session.

In one or more implementations, the participant mask generator 506 can also update participant masks based on changes within video streams. For example, the participant mask generator 506 can constantly monitor the area around the desired feature within a video stream to identify when the desired feature moves outside of the determined boundaries (e.g., because the participant depicted within the video stream moves). In response to determining that there has been a change within the video stream, the participant mask generator 506 can correct and transmit the determined boundaries based on the change.

In some implementations, the group effect system 102 can enable user creation of group effects. For example, the group effect system 102 may generate and provide one or more interfaces via the social networking system application 116 that include tools for a user to configure a custom group effect. The group effect system 102 can further make these custom group effects available to the custom group effect creator. Additionally, the group effect system 102 can enable the custom group effect creator to share the custom group effect with other friends via the social networking system 104.

As shown in FIGS. 1 and 5, the server(s) 108 and the participant computing devices 114*a*, 114*b* can include one or more physical processors, such as the physical processor 112. The physical processor 112 generally represents any type or form of hardware-implemented processing unit capable of interpreting and/or executing computer-readable instructions. In one implementation, the physical processor 112 may access and/or modify one or more of the components of the group effect system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 108 and the participant computing devices 114*a*, 114*b* can include the memory 106. In one or more implementations, the memory 106 generally represents any type or form of volatile or non-volatile storage device or medium capable of storing data and/or computer-readable instructions. In one example, the memory 106 may store, load, and/or maintain one or more of the components of the group effect system 102. Examples of the memory 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 5, the server(s) 108 and the participant computing devices 114*a*, 114*b* can include additional elements 110. On the server(s) 108, the additional elements 110 can include social networking system activity data 508 and the group effect data 510. In one or more implementations, the social networking system activity data 508 can include real-time communication session participants' social networking system posts, comments, likes, and other social networking system interactions. In some implementations, the social networking system activity data 508 can also include a history of real-time communication sessions associated with the real-time communication participants. Additionally, the group effect data 510 can include foreground display content and masking instructions associated with both composition group effects and multipeer group effects. In some implementations, the group effect data 510 can also include a history of group effects selected by a user of the participant computing device where the group effect data 510 is located.

In summary, the group effect system 102 can generate a variety of group effects during real-time communication session that enrich and add interest to what session participants see and hear during a real-time communication session. The group effect system 102 can utilize masking techniques to ensure the correct placement of areas of participant video streams relative to foreground display content to generate group effect displays that are immersive and accurate. In one or more implementations, the group effect system 102 can also enable real-time session participants to selectively engage in group effects by opting out of a group effect selected by a different session participant.

EXAMPLE IMPLEMENTATIONS

Example 1: A computer-implemented method for generating a group effect during a real-time communication session. For example, the method may include detecting, on a first participant computing device, a selection of a group effect option during a real-time communication session comprising a first video stream from the first participant computing device and a second video stream from a second participant computing device. The method may also include generating a first participant mask based on the first video stream and a group effect corresponding to the group effect option, receiving a second participant mask in combination with the second video stream from the second participant computing device, and generating a group effect display based on the group effect, the first participant mask, and the second participant mask.

Example 2: The computer-implemented method of Example 1, further including transmitting a notification associated with the group effect option and the first participant mask to the second participant computing device that causes the second participant computing device to generate the second participant mask.

Example 3: The computer-implemented method of any of Examples 1 and 2, further including replacing a real-time communication session display of the first video stream and the second video stream with the group effect display on the first participant computing device.

Example 4: The computer-implemented method of any of Examples 1-3, wherein detecting the selection of the group effect option is via an option listing of a plurality of group effect options associated with the real-time communication session.

Example 5: The computer-implemented method of any of Examples 1-4, wherein generating the first participant mask includes identifying the group effect corresponding to the group effect option, determining one or more masking instructions associated with the group effect, and determining first participant mask boundaries of an area within the first video stream indicated by the one or more masking instructions.

Example 6: The computer-implemented method of any of Examples 1-5, wherein receiving the second participant mask in combination with the second video stream from the second participant computing device includes receiving the second video stream, and receiving second participant mask boundaries of an area within the second video stream indicated by the one or more masking instructions associated with the group effect.

Example 7: The computer-implemented method of any of Examples 1-6, wherein generating the group effect display includes identifying foreground display content corresponding with the group effect, positioning the area of the first video stream defined by the first participant mask boundaries within the foreground display content, and positioning the area of the second video stream defined by the second participant mask boundaries within the foreground display content.

Example 8: The computer-implemented method of any of Examples 1-7, further including detecting an addition of a third participant computing device to the real-time communication session, transmitting the notification associated with the group effect option and the first participant mask to the third participant computing device that causes the third participant computing device to generate a third participant mask, receiving the third participant mask in combination with a third video stream from the third participant computing device, and updating the group effect display based on the group effect, the first participant mask, the second participant mask, and the third participant mask.

Example 9: The computer-implemented method of any of Examples 1-8, further including receiving, from the second participant computing device, a notification associated with a second group effect in combination with an updated second participant mask and the second video stream, and generating, within the group effect display on the first participant computing device, a group effect sub-display according to the second group effect and based on the updated second participant mask and the second video stream.

In some examples, a system may include at least one processor and a physical memory including computer-executable instructions that, when executed by the at least one processor, cause the at least one processor to perform various acts. For example, the computer-executable instructions may cause the at least one processor to perform acts including detecting, on a first participant computing device, a selection of a group effect option during a real-time communication session comprising a first video stream from the first participant computing device and a second video stream from a second participant computing device, generating a first participant mask based on the first video stream and a group effect corresponding to the group effect option, receiving a second participant mask in combination with the second video stream from the second participant computing device, and generating a group effect display based on the group effect, the first participant mask, and the second participant mask.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to detect, on a first participant computing device, a selection of a group effect option during a real-time communication session comprising a first video stream from the first participant computing device and a second video stream from a second participant computing device, generate a first participant mask based on the first video stream and a group effect corresponding to the group effect option, receive a second participant mask in combination with the second video stream from the second participant computing device, and generate a group effect display based on the group effect, the first participant mask, and the second participant mask.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

causing presentation of a first list of group effects via a first participant computing device and a second list of group effects via a second participant computing device, wherein the first list of group effects is different than the second list of group effects, wherein the first list of group effects comprises both a pre-existing group effect from a standard list of group effect options and a custom group effect that was previously created by a user of the first participant computing device;

detecting, on the first participant computing device, a selection of a first group effect from the first list of group effects during a real-time communication session comprising a first video stream from the first participant computing device and a second video stream from the second participant computing device;

generating a first participant mask based on the first video stream and the first group effect;

receiving a second participant mask in combination with the second video stream from the second participant computing device;

generating a group effect display based on the first group effect, the first participant mask, and the second participant mask;

detecting an interaction event in an area of the first participant mask;

determining that the interaction event satisfies a state-change condition for the first group effect;

in response to the interaction event satisfying the state-change condition, updating the first group effect from a first state to a second state; and causing the group effect display to transition from presenting first foreground display content associated with the first state to presenting second foreground display content associated with the second state.

2. The computer-implemented method of claim 1, further comprising transmitting a notification associated with the first group effect and the first participant mask to the second participant computing device that causes the second participant computing device to generate the second participant mask.

3. The computer-implemented method of claim 2, further comprising:

detecting an addition of a third participant computing device to the real-time communication session;

transmitting the notification associated with the first group effect and the first participant mask to the third participant computing device that causes the third participant computing device to generate a third participant mask;

receiving the third participant mask in combination with a third video stream from the third participant computing device; and updating the group effect display based on the first group effect, the first participant mask, the second participant mask, and the third participant mask.

4. The computer-implemented method of claim 1, further comprising replacing a real-time communication session display of the first video stream and the second video stream with the group effect display on the first participant computing device.

5. The computer-implemented method of claim 1, wherein generating the first participant mask comprises:

identifying the first group effect;

determining one or more masking instructions associated with the first group effect; and determining first participant mask boundaries of an area within the first video stream indicated by the one or more masking instructions.

6. The computer-implemented method of claim 5, wherein receiving the second participant mask in combination with the second video stream from the second participant computing device comprises:

receiving the second video stream; and receiving second participant mask boundaries of an area within the second video stream indicated by the one or more masking instructions associated with the first group effect.

7. The computer-implemented method of claim 6, wherein generating the group effect display comprises:

identifying foreground display content corresponding with the first group effect;

positioning the area of the first video stream defined by the first participant mask boundaries within the foreground display content; and positioning the area of the second video stream defined by the second participant mask boundaries within the foreground display content.

8. The computer-implemented method of claim 1, further comprising:

receiving, from the second participant computing device, a notification associated with a second group effect in combination with an updated second participant mask and the second video stream; and generating, within the group effect display on the first participant computing device, a group effect sub-display according to the second group effect and based on the updated second participant mask and the second video stream.

9. The method of claim 1, further comprising:

causing presentation of a vertically-oriented menu option list, the vertically-oriented menu option list including an effects menu option; and in response to a detected selection of the effects menu option, causing presentation of a horizontally sliding tray including the first list of group effects.

10. A system comprising:

at least one physical processor; and physical memory comprising computer-executable instructions that, when executed by the at least one physical processor, cause the at least one physical processor to perform acts comprising:

causing presentation of a first list of group effects via a first participant computing device and a second list of group effects via a second participant computing device, wherein the first list of group effects is different than the second list of group effects, wherein the first list of group effects comprises both a pre-existing group effect from a standard list of group effect options and a custom group effect that was previously created by a user of the first participant computing device;

detecting, on the first participant computing device, a selection of a first group effect from the first list of group effects during a real-time communication session comprising a first video stream from the first participant computing device and a second video stream from the second participant computing device;

generating a first participant mask based on the first video stream and the first group effect;

receiving a second participant mask in combination with the second video stream from the second participant computing device;

generating a group effect display based on the first group effect, the first participant mask, and the second participant mask;

detecting an interaction event in an area of the first participant mask;

determining that the interaction event satisfies a state-change condition for the first group effect;

in response to the interaction event satisfying the state-change condition, updating the first group effect from a first state to a second state; and causing the group effect display to transition from presenting first foreground display content associated with the first state to presenting second foreground display content associated with the second state.

11. The system of claim 10, wherein the computer-executable instructions, when executed by the at least one physical processor, further cause the at least one physical processor to perform an act comprising transmitting a notification associated with the first group effect and the first participant mask to the second participant computing device that causes the second participant computing device to generate the second participant mask.

12. The system of claim 11, wherein the computer-executable instructions, when executed by the at least one physical processor, further cause the at least one physical processor to perform acts comprising:

detecting an addition of a third participant computing device to the real-time communication session;

transmitting the notification associated with the first group effect and the first participant mask to the third participant computing device that causes the third participant computing device to generate a third participant mask;

receiving the third participant mask in combination with a third video stream from the third participant computing device; and updating the group effect display based on the first group effect, the first participant mask, the second participant mask, and the third participant mask.

13. The system of claim 10, wherein the computer-executable instructions, when executed by the at least one physical processor, further cause the at least one physical processor to perform an act comprising replacing a real-time communication session display of the first video stream and the second video stream with the group effect display on the first participant computing device.

14. The system of claim 10, wherein generating the first participant mask comprises:

identifying the first group effect;

determining one or more masking instructions associated with the first group effect; and determining first participant mask boundaries of an area within the first video stream indicated by the one or more masking instructions.

15. The system of claim 14, wherein receiving the second participant mask in combination with the second video stream from the second participant computing device comprises:

receiving the second video stream; and receiving second participant mask boundaries of an area within the second video stream indicated by the one or more masking instructions associated with the first group effect.

16. The system of claim 15, wherein generating the group effect display comprises:

identifying foreground display content corresponding with the first group effect;

positioning the area of the first video stream defined by the first participant mask boundaries within the foreground display content; and positioning the area of the second video stream defined by the second participant mask boundaries within the foreground display content.

17. The system of claim 10, the computer-executable instructions, when executed by the at least one physical processor, further cause the at least one physical processor to perform acts comprising:

receiving, from the second participant computing device, a notification associated with a second group effect in combination with an updated second participant mask and the second video stream; and generating, within the group effect display on the first participant computing device, a group effect sub-display according to the second group effect and based on the updated second participant mask and the second video stream.

18. A non-transitory computer-readable medium comprising one or more computer-executable instructions that, when executed by at least one processor of a computing device, cause the computing device to:

cause presentation of a first list of group effects via a first participant computing device and a second list of group effects via a second participant computing device, wherein the first list of group effects is different than the second list of group effects, wherein the first list of group effects comprises both a pre-existing group effect from a standard list of group effect options and a custom group effect that was previously created by a user of the first participant computing device;

detect, on the first participant computing device, a selection of a first group effect from the first list of group effects during a real-time communication session comprising a first video stream from the first participant computing device and a second video stream from the second participant computing device;

generate a first participant mask based on the first video stream and the first group effect;

receive a second participant mask in combination with the second video stream from the second participant computing device;

generate a group effect display based on the first group effect, the first participant mask, and the second participant mask;

detect an interaction event in an area of the first participant mask;

determine that the interaction event satisfies a state-change condition for the first group effect;

in response to the interaction event satisfying the state-change condition, update the first group effect from a first state to a second state; and cause the group effect display to transition from presenting first foreground display content associated with the first state to presenting second foreground display content associated with the second state.

19. The non-transitory computer-readable medium of claim 18, wherein the one or more computer-executable instructions cause the computing device to generate the first participant mask by:

identifying the first group effect;

determining one or more masking instructions associated with the first group effect; and determining first participant mask boundaries of an area within the first video stream indicated by the one or more masking instructions.

* * * * *